US008571263B2

(12) United States Patent
Shotton et al.

(10) Patent No.: US 8,571,263 B2
(45) Date of Patent: Oct. 29, 2013

(54) PREDICTING JOINT POSITIONS

(75) Inventors: Jamie Daniel Joseph Shotton, Cambridge (GB); Pushmeet Kohli, Cambridge (GB); Ross Brook Girshick, Chicago, IL (US); Andrew Fitzgibbon, Cambridge (GB); Antonio Criminisi, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 13/050,858

(22) Filed: Mar. 17, 2011

(65) Prior Publication Data

US 2012/0239174 A1 Sep. 20, 2012

(51) Int. Cl.
*G06K 9/00* (2006.01)
(52) U.S. Cl.
USPC .............................. 382/103; 348/135; 345/633
(58) Field of Classification Search
USPC ......... 382/103, 155–161, 181, 190, 195, 203, 382/224–228; 348/135, 169–172; 345/632, 345/633, 441, 646
See application file for complete search history.

(56) References Cited

U.S. PATENT DOCUMENTS

| 4,627,620 | A | 12/1986 | Yang |
| 4,630,910 | A | 12/1986 | Ross et al. |
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |
| 4,751,642 | A | 6/1988 | Silva et al. |
| 4,796,997 | A | 1/1989 | Svetkoff et al. |
| 4,809,065 | A | 2/1989 | Harris et al. |
| 4,817,950 | A | 4/1989 | Goo |
| 4,843,568 | A | 6/1989 | Krueger et al. |
| 4,893,183 | A | 1/1990 | Nayar |

(Continued)

FOREIGN PATENT DOCUMENTS

| CN | 201254344 | 6/2010 |
| EP | 0583061 | 2/1994 |

(Continued)

OTHER PUBLICATIONS

Aggarwal et al., "Human Motion Analysis: A Review", IEEE Non-rigid and Articulated Motion Workshop, 1997, University of Texas at Austin, Austin, TX.
Azarbayejani et al., "Visually Controlled Graphics", Jun. 1993, vol. 15, No. 6, IEEE Transactions on Pattern Analysis and Machine Intelligence.
Breen et al., "Interactive Occlusion and Collusion of Real and Virtual Objects in Augmented Reality", Technical Report ECRC-95-02, 1995, European Computer-Industry Research Center GmbH, Munich, Germany.
Brogan et al., "Dynamically Simulated Characters in Virtual Environments", Sep./Oct. 1998, pp. 2-13, vol. 18, Issue 5, IEEE Computer Graphics and Applications.

(Continued)

*Primary Examiner* — Anand Bhatnagar
(74) *Attorney, Agent, or Firm* — Zete Law, P.L.L.C.; MacLane C. Key

(57) ABSTRACT

Predicting joint positions is described, for example, to find joint positions of humans or animals (or parts thereof) in an image to control a computer game or for other applications. In an embodiment image elements of a depth image make joint position votes so that for example, an image element depicting part of a torso may vote for a position of a neck joint, a left knee joint and a right knee joint. A random decision forest may be trained to enable image elements to vote for the positions of one or more joints and the training process may use training images of bodies with specified joint positions. In an example a joint position vote is expressed as a vector representing a distance and a direction of a joint position from an image element making the vote. The random decision forest may be trained using a mixture of objectives.

20 Claims, 12 Drawing Sheets

(56) References Cited

U.S. PATENT DOCUMENTS

| | | | |
|---|---|---|---|
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,930,379 A | 7/1999 | Rehg et al. |
| 5,933,125 A | 8/1999 | Fernie et al. |
| 5,980,256 A * | 11/1999 | Carmein ........................ 434/55 |
| 5,989,157 A | 11/1999 | Walton |
| 5,995,649 A | 11/1999 | Marugame |
| 6,005,548 A * | 12/1999 | Latypov et al. ............... 345/156 |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A * | 10/2000 | Covell et al. .................. 382/286 |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,850,635 B2 * | 2/2005 | Gerard et al. ................. 382/132 |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Uderkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,728,839 B2 | 6/2010 | Yang et al. |
| 7,729,530 B2 | 6/2010 | Antonov et al. |
| 7,746,345 B2 | 6/2010 | Hunter |

(56) References Cited

U.S. PATENT DOCUMENTS

| | | | |
|---|---|---|---|
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,448,056 | B2 * | 5/2013 | Pulsipher et al. ............. 714/819 |
| 2004/0136583 | A1 * | 7/2004 | Harada et al. ................. 382/131 |
| 2008/0026838 | A1 | 1/2008 | Dunstan et al. |
| 2009/0175540 | A1 * | 7/2009 | Dariush et al. ............... 382/195 |
| 2010/0197393 | A1 | 8/2010 | Geiss |
| 2010/0278384 | A1 | 11/2010 | Shotton et al. |
| 2011/0249865 | A1 * | 10/2011 | Lee et al. ...................... 382/103 |
| 2011/0306398 | A1 * | 12/2011 | Boch et al. ......................... 463/7 |
| 2012/0128201 | A1 * | 5/2012 | Brickhill ....................... 382/103 |
| 2012/0163723 | A1 * | 6/2012 | Balan et al. ................... 382/224 |

FOREIGN PATENT DOCUMENTS

| | | |
|---|---|---|
| JP | 08044490 | 2/1996 |
| WO | WO9310708 | 6/1993 |
| WO | WO 9717598 | 5/1997 |
| WO | WO9944698 | 9/1999 |

OTHER PUBLICATIONS

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Isard et al., "Condensation—Conditional Density Propagation for Visual Tracking", 1998, pp. 5-28, International Journal of Computer Vision 29(1), Netherlands.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Kohler, "Special Topics of Gesture Recognition Applied in Intelligent Home Environments", In Proceedings of the Gesture Workshop, 1998, pp. 285-296, Germany.

Kohler, "Technical Details and Ergonomical Aspects of Gesture Recognition applied in Intelligent Home Environments", 1997, Germany.

Kohler, "Vision Based Remote Control in Intelligent Home Environments", University of Erlangen-Nuremberg/Germany, 1996, pp. 147-154, Germany.

Livingston, "Vision-based Tracking with Dynamic Structured Light for Video See-through Augmented Reality", 1998, University of North Carolina at Chapel Hill, North Carolina, USA.

Miyagawa et al., "CCD-Based Range Finding Sensor", Oct. 1997, pp. 1648-1652, vol. 44 No. 10, IEEE Transactions on Electron Devices.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Qian et al., "A Gesture-Driven Multimodal Interactive Dance System", Jun. 2004, pp. 1579-1582, IEEE International Conference on Multimedia and Expo (ICME), Taipei, Taiwan.

Rosenhahn et al., "Automatic Human Model Generation", 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Virtual High Anxiety", Tech Update, Aug. 1995, pp. 22.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", 2001, The Robotics Institute, Carnegie Mellon University, Pittsburgh, PA.

"Simulation and Training", 1994, Division Incorporated.

Breiman, et al., "Classification and Regression trees", Wadsworh International Group, Chapman and Hall, CRC, 1984, pp. 1-265.

Comaniciu, "Mean Shift: A Robust Approach Toward Feature Space Analysis", IEEE Transactions on Pattern Analysis and Machine Intelligence, vol. 24, No. 5, May 2002, pp. 603-619.

Gall, et al., "Class-Specific Hough Forests for Object Detection", IEEE Conference on Computer Vision and Pattern Recognition (CVPR), 2009, pp. 1-8.

Leibe, et al., "Robust Object Detection with Interleaved Categorization and Segmentation", International Journal of Computer Vision, Special Issue on Learning for Recognition and Recognition for Learning, vol. 77, No. 1-3, 2008, pp. 259-289.

Shotton, et al., "Real-time Human Pose Recognition in Parts from Single Depth Images", IEEE International Conference on Computer Vision and Pattern Recognition (CVPR), 2011, pp. 1-8.

Vitter, "Random Sampling with a Reservoir", ACM Transactions on Mathematical Software, vol. 11, No. 1, 1985, pp. 37-57.

U.S. Appl. No. 12/770,394, filed Apr. 29, 2010, "Multiple Centroid Condensation of Probability Distribution Clouds".

Ding, et al., "Extraction of Human Body Skeleton Based on Silhouette Images", retrieved on Nov. 22, 2010 at <<http://ieeexplore.ieee.org/stamp/stamp.jsp?arnumber=05459597>>, Intl Workshop on Education Technology and Computer Science, Wuhan, China, vol. 1, Mar. 2010, pp. 71-74.

Huang, et al., "Estimating Human Pose from Occluded Images", retrieved on Nov. 22, 2010 at <<http://faculty.ucmerced.edu/mhyang/papers/accv09a.pdf>>, Proceedings of Asian Conference on Computer Vision (ACCV), Xian, China, Sep. 2009, pp. 48-60.

Lee, et al., "Body Part Detection for Human Pose Estimation and Tracking", retrieved on Nov. 22, 2010 at <<http://iris.usc.edu/Outlines/papers/2007/lee-nevatia-wmvc-07.pdf>>, IEEE Computer Society, Workshop on Motion and Video Computing (WMVC), Austin, Texas, Feb. 2007, pp. 1-8.

Mori, "Guiding Model Search Using Segmentation", retrieved on Nov. 22, 2010 at <<http://www.cs.sfu.ca/~mori/research/papers/mori_iccv05.pdf>>, IEEE Intl Conference on Computer Vision (ICCV), Beijing, China, vol. 2, 2005, pp. 1417-1423.

Poppe, et al., "Body-part templates for recovery of 2D human poses under occlusion", retrieved on Nov. 22, 2010 at <<http://eprints.eemcs.utwente.nl/12886/01/poppe_poel_amdo_2008.pdf>>, Springer-Verlag Berlin, Proceedings of Intl Conference on Articulated Motion and Deformable Objects (AMDO), Mallorca, Spain, 2008, pp. 289-298.

* cited by examiner

PREDICTING JOINT POSITIONS

BACKGROUND

Predicting positions of human or animal joints in image data such as depth images, color video images and other types of images may be useful in many application domains such as augmented reality, immersive gaming, human computer interaction and others. In many of these application domains joint positions are to be predicted in real-time and often the available image data may be noisy or incomplete.

Existing joint position prediction systems may involve several stages of computation. Typically a prediction system is trained in advance using labeled image data. Often the training process is time consuming and computationally intensive.

The embodiments described below are not limited to implementations which solve any or all of the disadvantages of known joint position prediction systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Predicting joint positions is described, for example, to find joint positions of humans or animals (or parts of humans or animals) in an image in order to control a computer game or for other applications. In an embodiment image elements of a depth image make joint position votes so that for example, an image element depicting part of a torso may vote for a position of a neck joint, a left knee joint and a right knee joint. A random decision forest may be trained to enable image elements to vote for the positions of one or more joints and the training process may use training images of bodies with specified joint positions. In an example a joint position vote is expressed as a vector representing a distance and a direction of a joint position from an image element making the vote. The random decision forest may be trained using a mixture of decision tree node-splitting objectives.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computer game system, the system described is provided as an example and not a limitation. As those skilled in the art will appreciate, the present examples are suitable for application in a variety of different types of computing and image processing systems.

Figure 1:
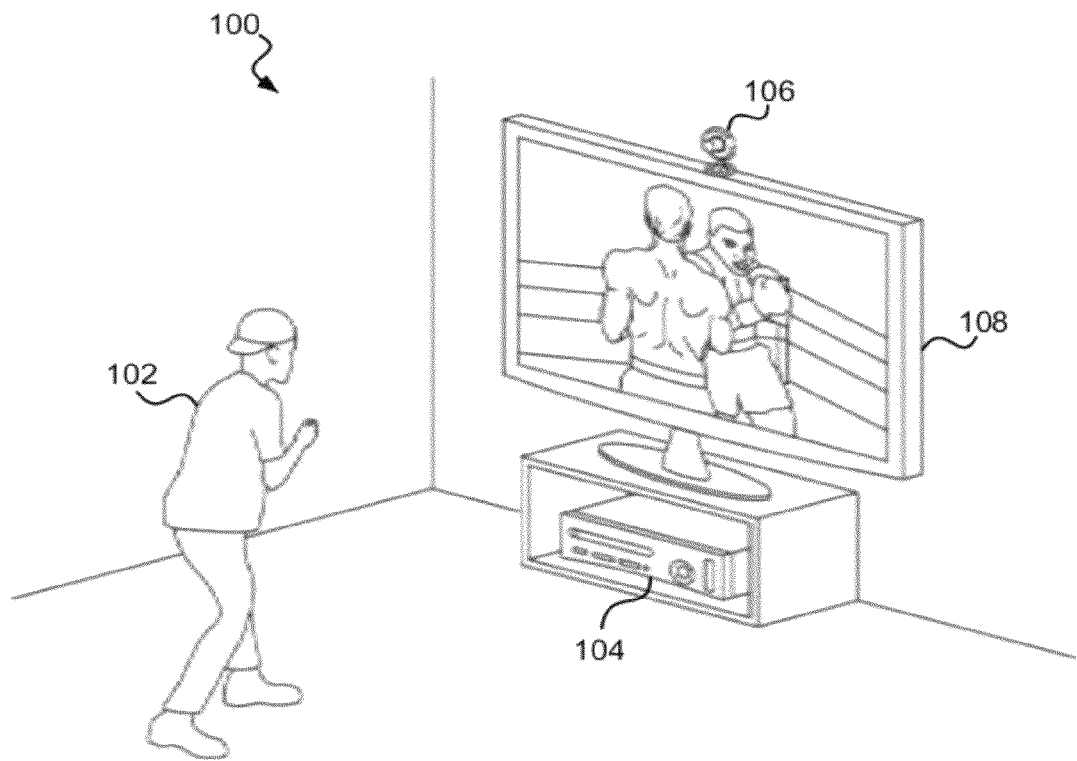
FIG. 1 illustrates an example camera-based control system for controlling a computer game.

FIG. 1 shows an example camera-based control system 100 for controlling a computer game. FIG. 1 shows a user 102 playing, in this illustrative example, a boxing game. In some examples, camera-based control system 100 can be used to, among other things, determine body pose, bind, recognize, analyze, track, associate to a human target, provide feedback, interpret gestures, and/or adapt to aspects of a human target such as the user 102.

The camera-based control system 100 comprises a computing device 104. The computing device 104 can be a general purpose computer, gaming system or console, or dedicated image processing device. The computing device 104 can include hardware components and/or software components such that the computing device 104 can be used to execute applications such as gaming applications and/or non-gaming applications. The structure of the computing device 104 is discussed hereinafter with reference to FIG. 12.

The camera-based control system 100 further comprises a capture device 106. The capture device 106 can be, for example, an image sensor or detector that can be used to visually monitor one or more users (such user 102) such that gestures performed by the one or more users can be captured, analyzed, processed, and tracked to perform one or more controls or actions within a game or application, as described in more detail below.

The camera-based control system 100 can further comprise a display device 108 connected to the computing device 104. The computing device can be a television, a monitor, a high-definition television (HDTV), or the like that can provide game or application visuals (and optionally audio) to the user 102.

In operation, the user 102 can be tracked using the capture device 106 such that the joint positions, movements and size of user 102 can be interpreted by the computing device 104 (and/or the capture device 106) as controls that can be used to affect the application being executed by computing device 104. As a result, the user 102 can move his or her body to control an executed game or application.

In the illustrative example of FIG. 1, the application executing on the computing device 104 is a boxing game that the user 102 is playing. In this example, the computing device 104 controls the display device 108 to provide a visual representation of a boxing opponent to the user 102. The computing device 104 also controls the display device 108 to provide a visual representation of a user avatar that the user 102 can control with his or her movements. For example, the user 102 can throw a punch in physical space to cause the user avatar to throw a punch in game space. Thus, according to this example, the computing device 104 and the capture device 106 of the camera-based control system 100 can be used to recognize and analyze the punch of the user 102 in physical space such that the punch may be interpreted as a game control of the user avatar in game space.

Furthermore, some movements can be interpreted as controls that correspond to actions other than controlling the avatar. For example, the user can use movements to enter, exit, turn system on or off, pause, save a game, select a level, profile or menu, view high scores, communicate with a friend, etc. Additionally, movement of the user 102 can be used and analyzed in any suitable manner to interact with applications other than games, for example to enter text, select icons or menu items, control media playback, browse websites or operate any other controllable aspect of an operating system or application.

Figure 2:
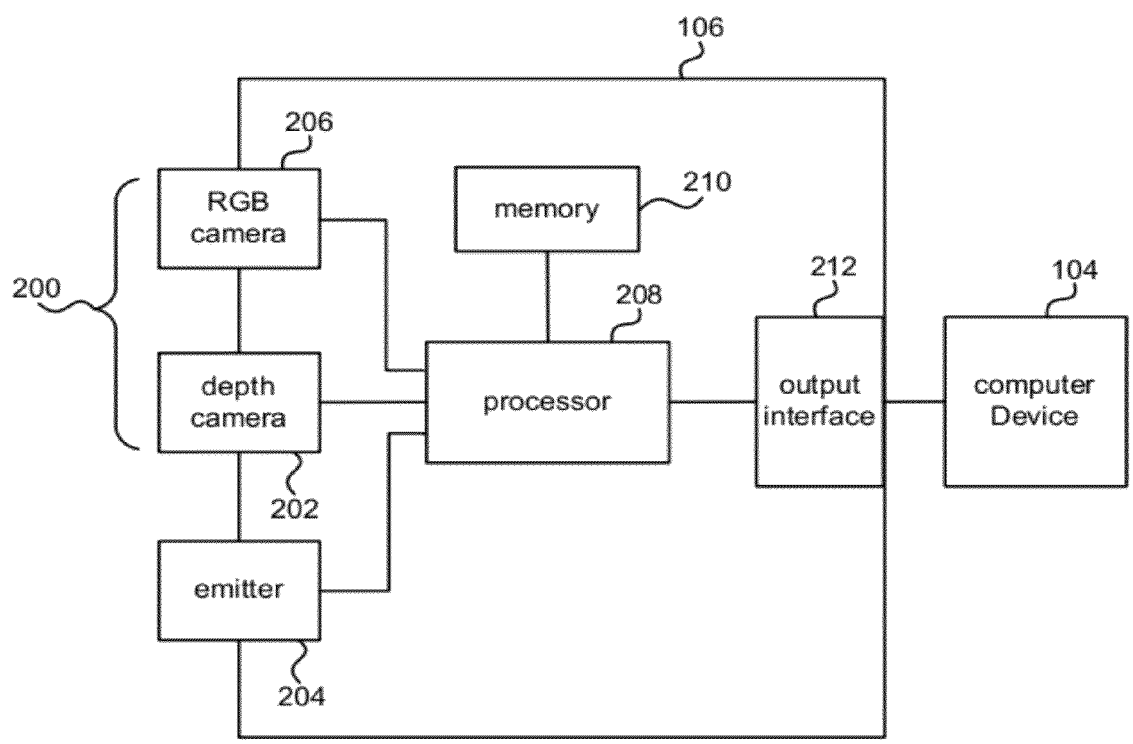
FIG. 2 is a schematic diagram of an image capture device.

Reference is now made to FIG. 2, which illustrates a schematic diagram of the capture device 106 that can be used in the camera-based control system 100 of FIG. 1. In the example of FIG. 2 the capture device 106 is configured to capture video images with depth information. Such a capture device can be referred to as a depth camera. The depth information can be in the form of a depth image that includes depth values, i.e. a value associated with each image element of the depth image that is related to the distance between the depth camera and an item or object located at that image element.

The depth information can be obtained using any suitable technique including, for example, time-of-flight, structured light, stereo image, or the like. In some examples, the capture device 106 can organize the depth information into "Z layers," or layers that may be perpendicular to a Z-axis extending from the depth camera along its line of sight.

As shown in FIG. 2, the capture device 106 comprises at least one imaging sensor 200. In the example shown in FIG. 2, the imaging sensor 200 comprises a depth camera 202 arranged to capture a depth image of a scene. The captured depth image can include a two-dimensional (2-D) area of the captured scene where each image element in the 2-D area represents a depth value such as a length or distance of an object in the captured scene from the depth camera 202.

The capture device can also include an emitter 204 arranged to illuminate the scene in such a manner that depth information can be ascertained by the depth camera 202. For example, in the case that the depth camera 202 is an infra-red (IR) time-of-flight camera, the emitter 204 emits IR light onto the scene, and the depth camera 202 is arranged to detect backscattered light from the surface of one or more targets and objects in the scene. In some examples, pulsed infrared light can be emitted from the emitter 204 such that the time between an outgoing light pulse and a corresponding incoming light pulse can be detected by the depth camera and measured and used to determine a physical distance from the capture device 106 to a position on the targets or objects in the scene. Additionally, in some examples, the phase of the outgoing light wave from the emitter 204 can be compared to the phase of the incoming light wave at the depth camera 202 to determine a phase shift. The phase shift can then be used to determine a physical distance from the capture device 106 to a position on the targets or objects. In a further example, time-of-flight analysis can be used to indirectly determine a physical distance from the capture device 106 to a position on the targets or objects by analyzing the intensity of the reflected beam of light over time via various techniques including, for example, shuttered light pulse imaging.

In another example, the capture device 106 can use structured light to capture depth information. In such a technique, patterned light (e.g., light displayed as a known pattern such as grid pattern or a stripe pattern) can be projected onto the scene using the emitter 204. Upon striking the surface of one or more targets or objects in the scene, the pattern becomes deformed. Such a deformation of the pattern can be captured by the depth camera 202 and then be analyzed to determine a physical distance from the capture device 106 to a position on the targets or objects in the scene.

In another example, the depth camera 202 can be in the form of two or more physically separated cameras that view a scene from different angles, such that visual stereo data is obtained that can be resolved to generate depth information. In this case the emitter 204 can be used to illuminate the scene or can be omitted.

In some examples, in addition to the depth camera 202, the capture device 106 can comprise a regular video camera, which is referred to as an RGB camera 206. The RGB camera 206 is arranged to capture sequences of images of the scene at visible light frequencies, and can hence provide images that can be used to augment the depth images. In alternative examples, the RGB camera 206 can be used instead of the depth camera 202.

The capture device 106 shown in FIG. 2 further comprises at least one processor 208, which is in communication with the imaging sensor 200 (i.e. depth camera 202 and RGB camera 206 in the example of FIG. 2) and the emitter 204. The processor 208 can be a general purpose microprocessor, or a specialized signal/image processor. The processor 208 is arranged to execute instructions to control the imaging sensor 200 and emitter 204 to capture depth images and/or RGB images. The processor 208 can also optionally be arranged to perform processing on these images, as outlined in more detail hereinafter.

In some examples the imaging sensor is used to provide silhouette images which are two dimensional binary images identifying foreground and background regions of the depth and/or RGB images captured by the imaging sensor. The silhouette images may be formed at the imaging sensor and/or processor 208 from the captured depth and RGB images. The silhouette images may be processed using the methods described herein to predict two dimensional joint positions. In this case the silhouette images can be thought of as depth images flattened to a fixed depth. The captured depth images may be used to predict three dimensional joint positions as described in more detail below.

The capture device 106 shown in FIG. 2 further includes a memory 210 arranged to store the instructions that for execution by the processor 208, images or frames of images captured by the depth camera 202 or RGB camera 206, or any other suitable information, images, or the like. In some examples, the memory 210 can include random access memory (RAM), read only memory (ROM), cache, Flash memory, a hard disk, or any other suitable storage component. The memory 210 can be a separate component in communication with the processor 208 or integrated into the processor 208.

The capture device 106 also comprises an output interface 212 in communication with the processor 208 and is arranged to provide data to the computing device 104 via a communication link. The communication link can be, for example, a wired connection (such as USB, Firewire, Ethernet or similar) and/or a wireless connection (such as WiFi, Bluetooth or similar). In other examples, the output interface 212 can interface with one or more communication networks (such as the internet) and provide data to the computing device 104 via these networks.

Figure 3:
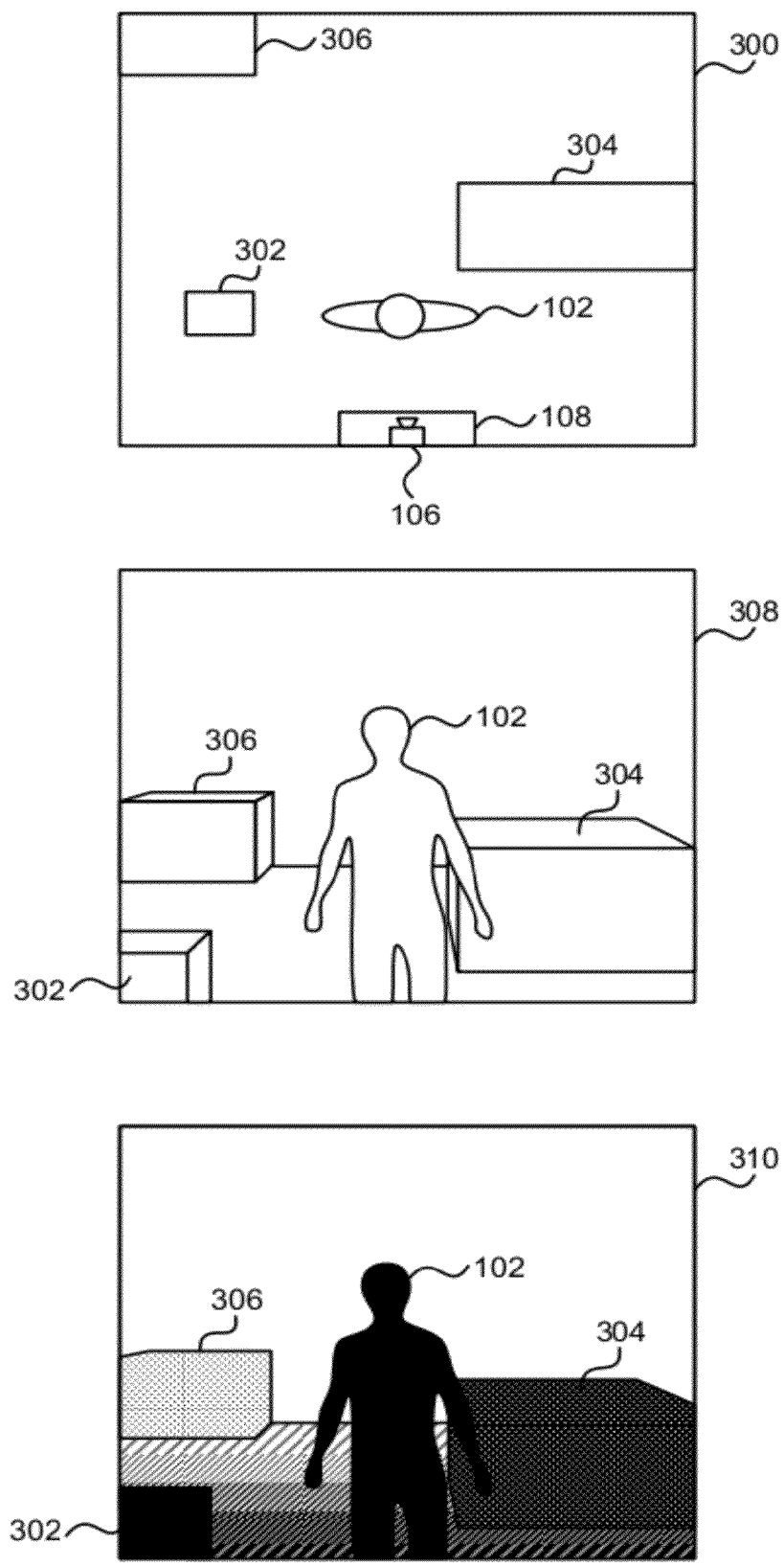
FIG. 3 illustrates an example scene as captured by a depth camera.

Reference is now made to FIG. 3, which illustrates an example scene as captured by a depth camera such as that shown in FIG. 2. A first view 300 shows the scene from above, and includes the user 102 stood in front of the capture device 106 and the display device 108. The user 102 is in a room having a floor, walls and a ceiling, and the room also contains a number of objects. A first object 302 is located at approximately the same distance from the capture device 106 as the user 102, and is in proximity to the user 102, but not in contact with the user 102. A second object 304 is located behind the user 102, such that the user 102 and the second object 304 overlap from the viewpoint of the capture device 104. The second object 304 is, however, a further distance away from the capture device 104 than the user 102. A third object 306 is located at the back of the room, and does not overlap with the user.

The first, second, and third objects can be, for example, furniture such as tables, chairs, shelves, sofas, couches, and the like. The objects can also be animate objects such as other persons or pets.

A second view 308 shows the scene from the point of view of the capture device 106. The second view 308 shows: the first object 302 to the left of, but not overlapping with, the user 102; the second object 304 overlapping an arm of the user 102; and the third object not overlapping with, the user. The second view 308 represents an image of the form taken by the RGB camera 206 in the capture device 106. Such an image can show information such as the color, texture or brightness of the objects in the scene. However, the information on the relative distances of the object in such an image is limited. Some distance information may be discernable through perspective, but this can be difficult to analyze using a computer. In other words, it is difficult for a computer to determine the relative depths of the objects from an image such as that shown in the second view 308.

On the other hand, a depth image, such as that captured by the depth camera 202, conveys useful depth information. An example depth image 310 is shown in the third view of the scene. In a depth image, each image element has an associated value that represents the measured distance between the capture device 106 and an object located at that image element. The associated values can be represented visually as intensity values in an image. For example, image elements representing objects close to the capture device 106 (i.e. a small distance) can be represented as having low intensity (i.e. dark/black) and image elements representing objects far away to the capture device 106 (i.e. a large distance) can be represented as having high intensity (i.e. light/white). Image elements between these two extreme distances can be represented by a corresponding shade of gray.

As shown in the depth image 310, the user 102 and the first object 302 are both approximately the same distance from the capture device 106, and are close to the capture device 106, and hence have a similar intensity value (black in this example). The second object 304 has a lighter intensity value than the user 102, due to being a greater distance from the capture device 106. The third object has a lighter intensity value still, due to being a yet further away from the capture device 106. The floor of the room has a graduated intensity value in the depth image 310, getting lighter as it stretches away from the capture device 106. The far wall of the room is shown in white, indicating it is the furthest distance shown in FIG. 3 from the capture device 106.

Clearly, the example shown in FIG. 3 is merely illustrative and for the purposes of explanation only. A real-life depth image comprises many more shades of intensity (even within one object), may have more noise, need not precisely extend between the intensity extremes of black for the user and white for the far wall, and does not show edges around objects.

Depth images are useful in the context of camera-based control systems such as that shown in FIG. 1 because they enable 3-D models of the user to be created, which reflect the user's movements in three dimensions. This enables the user to control the computing device using more realistic and accurate movements (as opposed to those simply seen face-on by a regular camera). Also, where silhouette images are provided as an input modality, depth assists in removing ambiguities.

Figure 4:
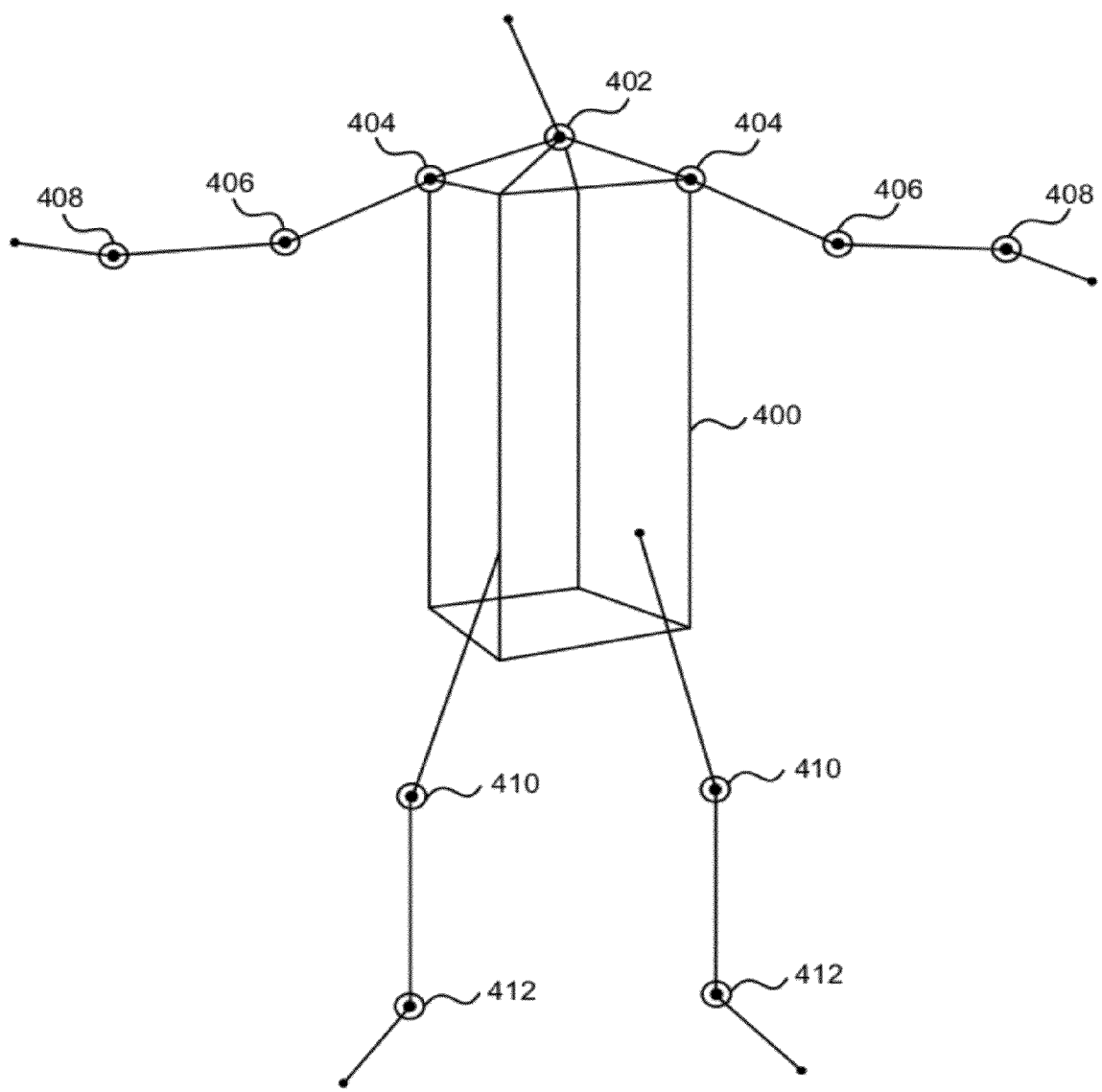
FIG. 4 is a schematic diagram of joint positions predicted in an image of a person.

To generate a 3-D model of the user, joint positions of the user may be predicted. FIG. 4 is a schematic diagram showing predicted joint positions of a user standing with his or her arms outstretched. In this example, predicted joint positions for the neck 402, shoulders 404, elbows 406, wrists 408, knees 410 and ankles 412 are shown. However, any number and combination of joint positions may be predicted according to the problem domain and the computing resources available.

Figure 5:
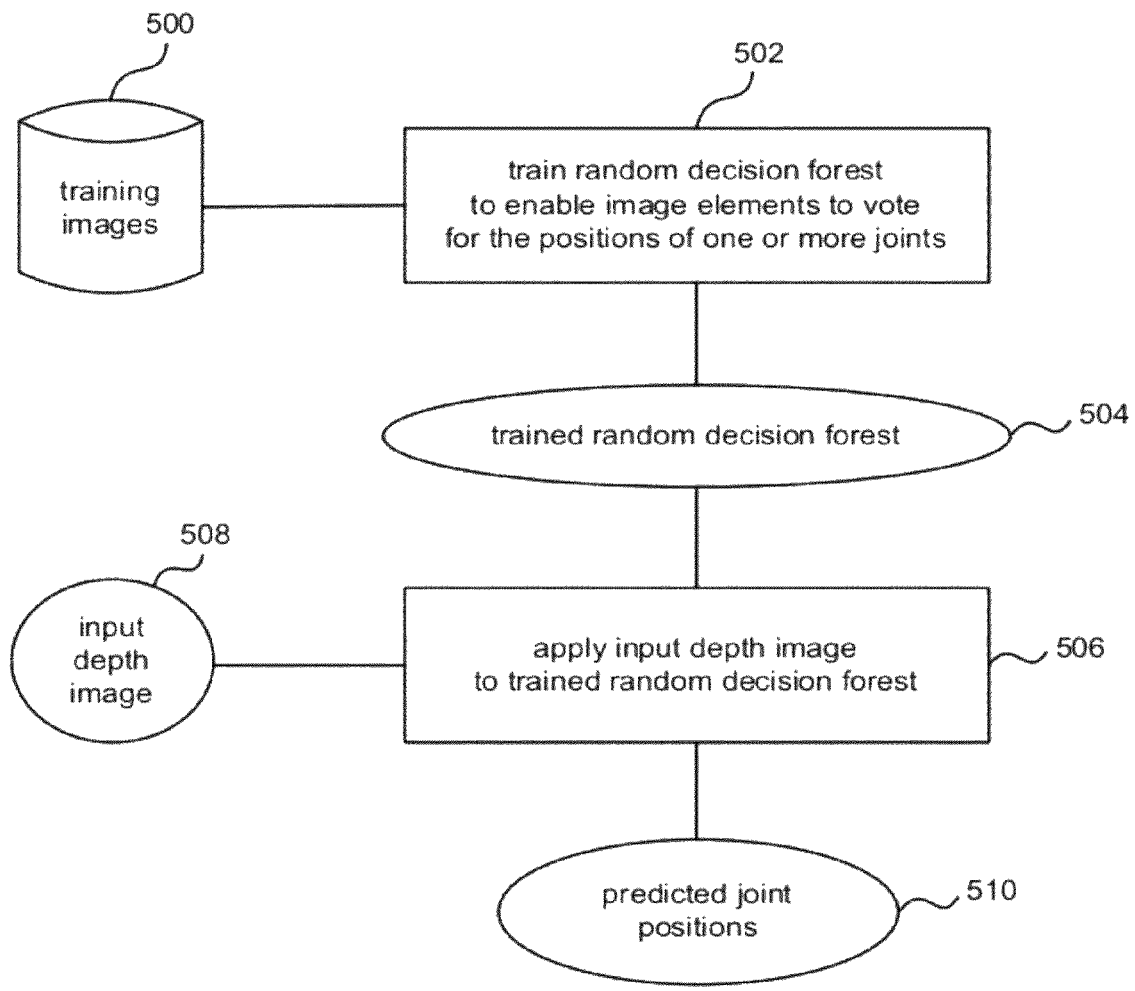
FIG. 5 is a flow diagram of a method of predicting joint positions in an input depth image.

FIG. 5 is a flow diagram of predicting joint positions in an input depth image 508 depicting one or more humans or animals or parts of humans or animals. A plurality of training images 500 which may be depth images that have specified joint positions is available. The images may be two dimensional, three dimensional or higher dimensional images or sequences of such images. The examples described herein use depth images but are also applicable to color images, medical images or other types of image.

A random decision forest is trained 502 to enable image elements of the training images 500 to vote for the positions of one or more joints depicted in those images. Image elements may be pixels, groups of pixels, voxels, groups of voxels, blobs, patches or other components of an image. A random decision forest comprises one or more decision trees each having a root node, a plurality of split nodes and a plurality of leaf nodes. Image elements of an image may be pushed through trees of a random decision forest from the root to a leaf node in a process whereby a decision is made at each split node. The decision is made according to characteristics of the image element and characteristics of test image elements displaced therefrom by spatial offsets specified by the parameters at the split node. At a split node the image element proceeds to the next level of the tree down a branch chosen according to the results of the decision. The random decision forest may use regression or classification as described in more detail below. During training, parameter values (also referred to as features) are learnt for use at the split nodes and data is accumulated at the leaf nodes. For example, joint position votes are accumulated at the leaf nodes. A joint position vote is an image position (or region) where a joint is predicted to be relative to an image element making the vote. A joint position vote may be specified in any suitable manner. For example, as a vector expressing the relative distance and direction of a predicted joint position from an image element making the vote. It is not essential to use a vector, other formats may be used.

Storing all the joint position votes at the leaf nodes during training may be very memory intensive since large amounts of training data are typically used for practical applications. In some embodiments the votes are aggregated in order that they may be stored in a compact manner. Various different aggregation processes may be used as described in more detail below.

At test time a previously unseen depth image 508 is input to the system to have joint positions predicted. It is applied to the trained random decision forest 506 to obtain predicted joint positions 501. Each image element of the input depth image 508 may be sent through each tree of the trained random decision forest and joint position votes obtained from the leaves. In this way votes may be made by comparing each image element with test image elements displaced therefrom by learnt spatial offsets. Each image element may make a plurality of votes for each joint. These votes may be aggregated according to various different aggregation methods to give the predicted joint positions 510. The test time process is therefore a single stage process of applying the input depth image to the trained random decision forest to directly obtain predicted joint positions. The single stage process does not involve intermediate results such as body parts being predicted. This single stage process may be carried out in a fast and effective manner to give results in real-time and with high quality results.

Figure 6:
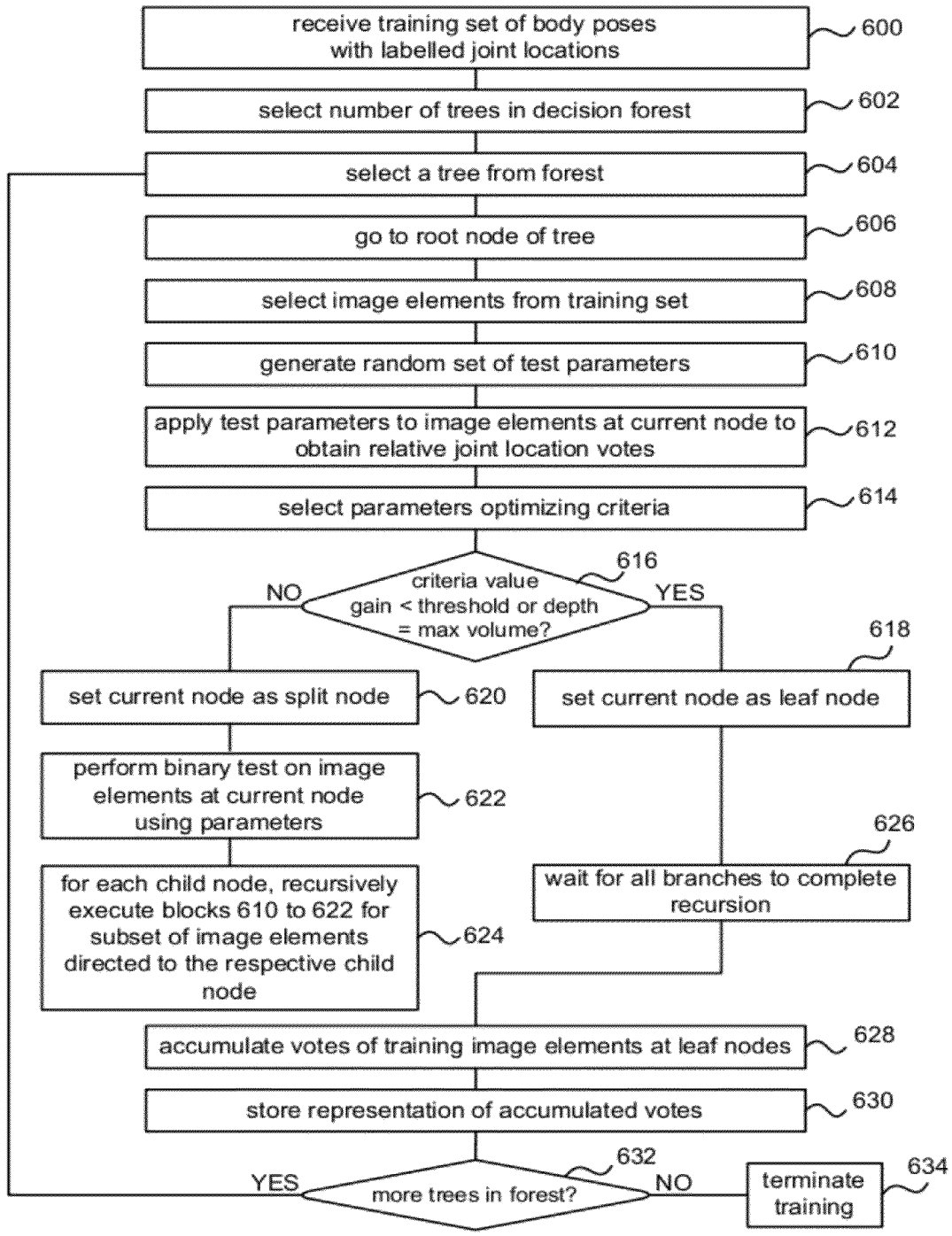
FIG. 6 is a flow diagram of a method of training a random decision forest.

FIG. 6 is a flowchart of a process for training a decision forest to identify joint positions in an image. This can also be thought of as generating joint position votes from image elements of an image. The decision forest is trained using a set of training images. The set of training images comprise a plurality images each showing at least one human or animal or part of a human or animal body. The bodies or body parts depicted in the training images are in various different poses (such as sitting or standing). Joint positions in the training images are specified. Therefore, the training set forms a ground-truth database.

In one example, rather than capturing depth images for many different examples of body poses, the training set can comprise synthetic computer generated images. Such synthetic images realistically model the human or animal body (or parts of the human or animal body) in different poses interacting with different objects, and can be generated to be viewed from any angle or position. They can be produced much more quickly than real depth images, and can provide a wider variety of training images.

Referring to FIG. 6, to train the decision trees, the training set described above is first received 600. The number of decision trees to be used in a random decision forest is selected 602. A random decision forest is a collection of deterministic decision trees. Decision trees can be used in classification or regression algorithms, but can suffer from over-fitting, i.e. poor generalization. However, an ensemble of many randomly trained decision trees (a random forest) yields improved generalization. During the training process, the number of trees is fixed.

Figure 7:
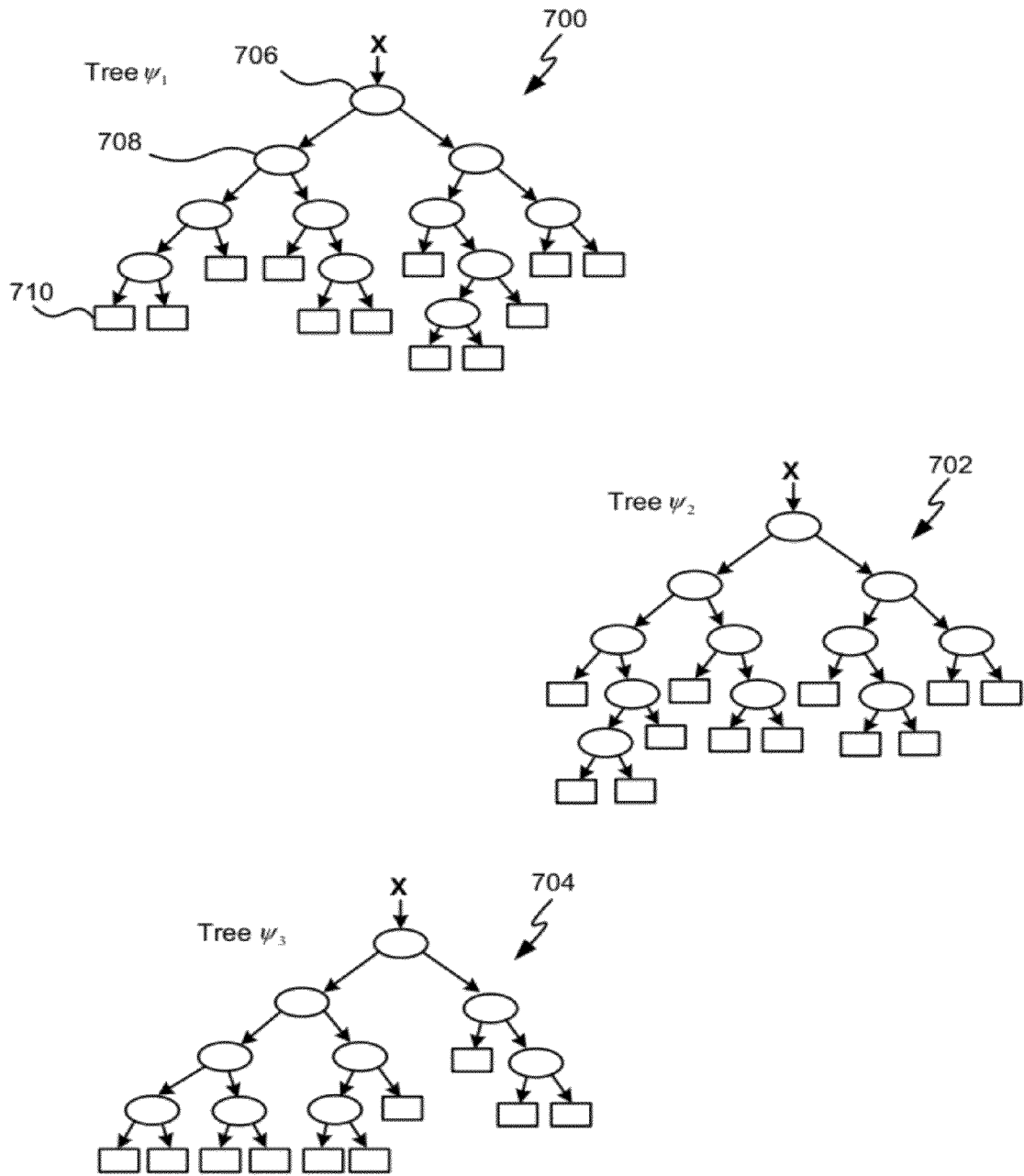
FIG. 7 is a schematic diagram of a random decision forest.

The following notation is used to describe the training process. An image element in a image I is defined by its coordinates $x=(x,y)$. The forest is composed of T trees denoted $\Psi_1, \ldots, \Psi_t, \ldots, \Psi_T$ with t indexing each tree. An example random decision forest is shown illustrated in FIG. 7. The illustrative decision forest of FIG. 7 comprises three decision trees: a first tree 700 (denoted tree $\Psi_1$); a second tree 702 (denoted tree $\Psi_2$); and a third tree 704 (denoted tree $\Psi_3$). Each decision tree comprises a root node (e.g. root node 706 of the first decision tree 700), a plurality of internal nodes, called split nodes (e.g. split node 708 of the first decision tree 700), and a plurality of leaf nodes (e.g. leaf node 710 of the first decision tree 700).

In operation, each root and split node of each tree performs a binary test on the input data and based on the result directs the data to the left or right child node. The leaf nodes do not perform any action; they store accumulated joint position votes (and optionally other information). For example, probability distributions may be stored representing the accumulated joint position votes. In some examples the leaf nodes optionally store other information such as probability distributions over body parts. In this case the forest is able to act both as a regression forest to predict joint positions and as a classification forest to predict surface body parts.

The manner in which the parameters used by each of the split nodes are chosen and how the leaf node probabilities may be computed is now described. A decision tree from the decision forest is selected 604 (e.g. the first decision tree 600) and the root node 606 is selected 606. At least a subset of the image elements from each of the training images are then selected 608. For example, the image may be segmented so that image elements in foreground regions are selected. Each selected image element x of each training image is associated with a plurality of known joint positions. For example, an image element at the torso may be associated with a known joint position for the left hip and a known joint position for the right hip. In another example, an image element at the torso may be associated with all known joint positions in the image.

A random set of test parameters are then generated 610 for use by the binary test performed at the root node as candidate features. In one example, the binary test is of the form: $\xi > f(x;\theta) > \tau$, such that $f(x;\theta)$ is a function applied to image element x with parameters $\theta$, and with the output of the function compared to threshold values $\xi$ and $\tau$. If the result of $f(x;\theta)$ is in the range between $\xi$ and $\tau$ then the result of the binary test is true. Otherwise, the result of the binary test is false. In other examples, only one of the threshold values $\xi$ and $\tau$ can be used, such that the result of the binary test is true if the result of $f(x;\theta)$ is greater than (or alternatively less than) a threshold value. In the example described here, the parameter $\theta$ defines a feature of the image.

A candidate function $f(x;\theta)$ can only make use of image information which is available at test time. The parameter $\theta$ for the function $f(x;\theta)$ is randomly generated during training. The process for generating the parameter $\theta$ can comprise generating random spatial offset values in the form of a two or three dimensional displacement. The result of the function $f(x;\theta)$ is then computed by observing the depth value for a test image element which is displaced from the image element of interest x in the image by the spatial offset. The spatial offsets are optionally made depth invariant by scaling by 1/depth of the image element of interest. The threshold values $\xi$ and $\tau$ can be used to decide whether the test image element is at a joint position.

This candidate function illustrates how the features in the images can be captured by considering the relative layout of visual patterns. For example, elbow joint image elements tend to occur a certain distance away, in a certain direction, from the shoulder joints and wrists of the body, and ankle joint image elements tend to occur a certain distance away, in a certain direction, from knee joint image elements.

The result of the binary test performed at a root node or split node determines which child node an image element is passed to. For example, if the result of the binary test is true, the image element is passed to a first child node, whereas if the result is false, the image element is passed to a second child node.

The random set of test parameters generated comprise a plurality of random values for the function parameter θ and the threshold values ξ and τ. In order to inject randomness into the decision trees, the function parameters θ of each split node are optimized only over a randomly sampled subset Θ of all possible parameters. This is an effective and simple way of injecting randomness into the trees, and increases generalization.

Figure 8:
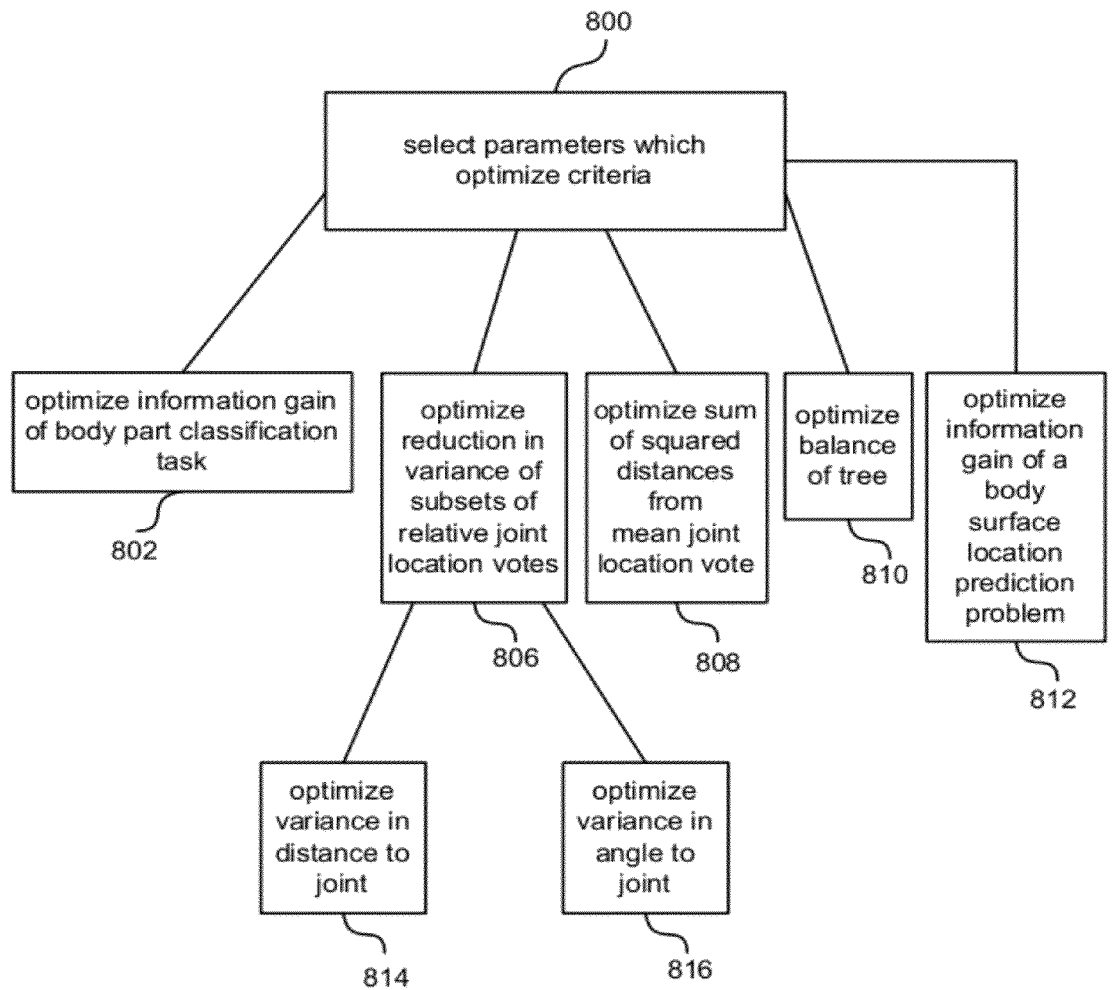
FIG. 8 is a flow diagram of part of the training process of FIG. 6 in more detail.

Then, every combination of test parameter may be applied 612 to each image element in the set of training images. In other words, available values for θ (i.e. $\theta_i \in \Theta$) are tried one after the other, in combination with available values of ξ and τ for each image element in each training image. For each combination, criteria (also referred to as objectives) are calculated 614. In an example, the calculated criteria comprise the information gain (also known as the relative entropy). Other examples of criteria are described below with reference to FIG. 8. The combination of parameters that optimize the criteria (such as maximizing the information gain (denoted θ*, ξ* and τ*)) is selected 614 and stored at the current node for future use. As an alternative to information gain, other criteria can be used, such as Gini entropy, or the 'two-ing' criterion or others described with reference to FIG. 8.

It is then determined 616 whether the value for the calculated criteria is less than (or greater than) a threshold. If the value for the calculated criteria is less than the threshold, then this indicates that further expansion of the tree does not provide significant benefit. This gives rise to asymmetrical trees which naturally stop growing when no further nodes are beneficial. In such cases, the current node is set 618 as a leaf node. Similarly, the current depth of the tree is determined (i.e. how many levels of nodes are between the root node and the current node). If this is greater than a predefined maximum value, then the current node is set 618 as a leaf node. Each leaf node has joint position votes which accumulate at that leaf node during the training process as described below.

It is also possible to use another stopping criterion in combination with those already mentioned. For example, to assess the number of example image elements that reach the leaf. If there are too few examples (compared with a threshold for example) then the process may be arranged to stop to avoid overfitting. However, it is not essential to use this stopping criterion.

If the value for the calculated criteria is greater than or equal to the threshold, and the tree depth is less than the maximum value, then the current node is set 620 as a split node. As the current node is a split node, it has child nodes, and the process then moves to training these child nodes. Each child node is trained using a subset of the training image elements at the current node. The subset of image elements sent to a child node is determined using the parameters that optimized the criteria. These parameters are used in the binary test, and the binary test performed 622 on all image elements at the current node. The image elements that pass the binary test form a first subset sent to a first child node, and the image elements that fail the binary test form a second subset sent to a second child node.

For each of the child nodes, the process as outlined in blocks 610 to 622 of FIG. 6 are recursively executed 624 for the subset of image elements directed to the respective child node. In other words, for each child node, new random test parameters are generated 610, applied 612 to the respective subset of image elements, parameters optimizing the criteria selected 614, and the type of node (split or leaf) determined 616. If it is a leaf node, then the current branch of recursion ceases. If it is a split node, binary tests are performed 622 to determine further subsets of image elements and another branch of recursion starts. Therefore, this process recursively moves through the tree, training each node until leaf nodes are reached at each branch. As leaf nodes are reached, the process waits 626 until the nodes in all branches have been trained. Note that, in other examples, the same functionality can be attained using alternative techniques to recursion.

Figure 9:
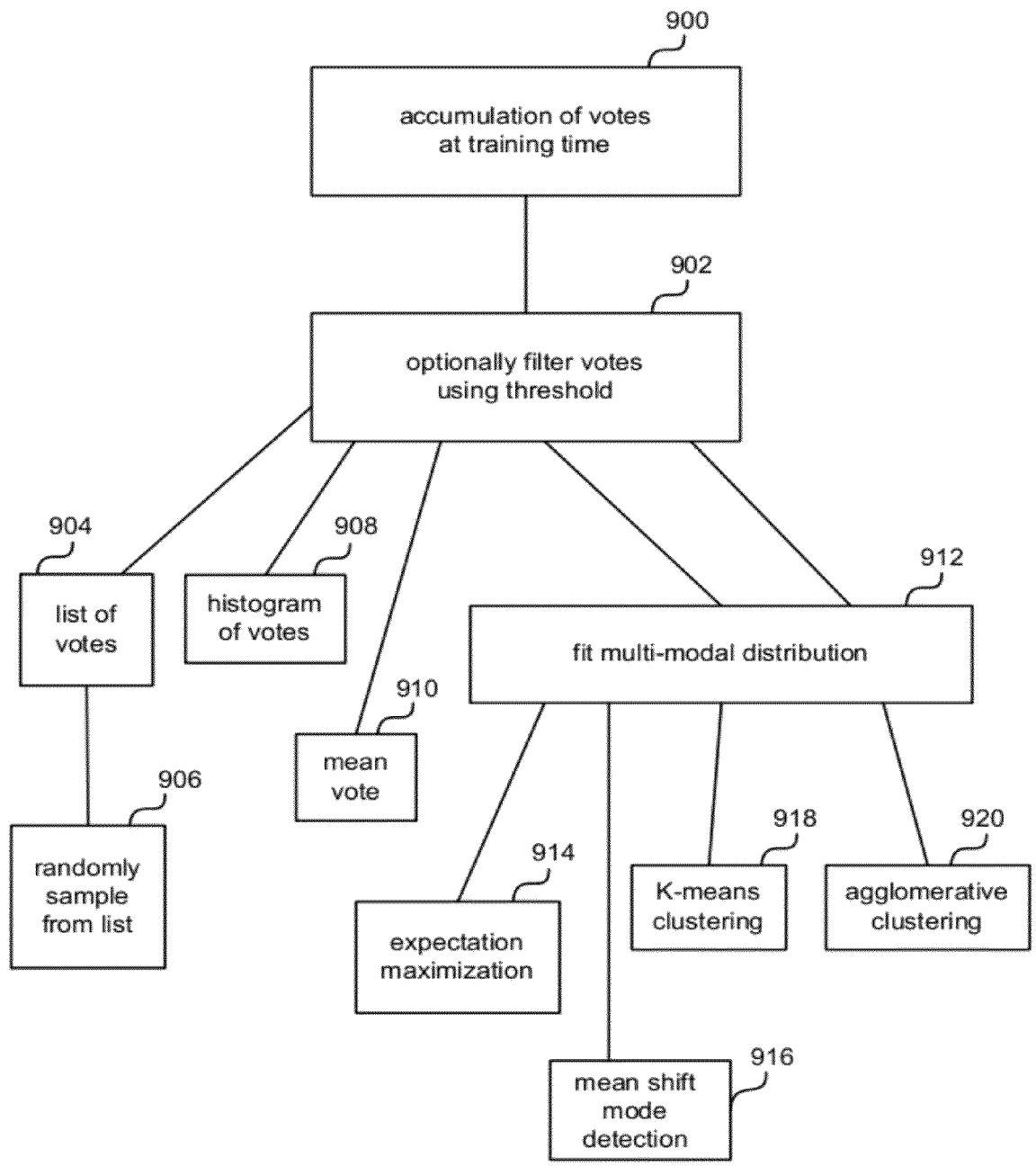
FIG. 9 is a flow diagram of aggregation of joint prediction votes at training time.

Once all the nodes in the tree have been trained to determine the parameters for the binary test optimizing the criteria at each split node, and leaf nodes have been selected to terminate each branch, then votes may be accumulated 628 at the leaf nodes of the tree. This is the training stage and so particular image elements which reach a given leaf node have specified relative joint position votes known from the ground truth training data. A representation of the accumulated votes may be stored 630 using various different methods as described in more detail with reference to FIG. 9. Optionally sampling may be used to select votes to be accumulated and stored in order to maintain a low memory footprint. For example, reservoir sampling may be used whereby a fixed maximum sized sample of votes is taken. Selection may be random or in any other manner.

Once the accumulated votes have been stored it is determined 632 whether more trees are present in the decision forest. If so, then the next tree in the decision forest is selected, and the process repeats. If all the trees in the forest have been trained, and no others remain, then the training process is complete and the process terminates 634.

Therefore, as a result of the training process, one or more decision trees are trained using synthesized or empirical training images. Each tree comprises a plurality of split nodes storing optimized test parameters, and leaf nodes storing associated joint position votes or representations of aggregated joint position votes. Due to the random generation of parameters from a limited subset used at each node, the trees of the forest are distinct (i.e. different) from each other.

The training process may be performed in advance of using the trained prediction system to identify joint positions in a real depth image. The decision forest and the optimized test parameters may be stored on a storage device for use in identifying joint positions in depth images at a later time.

It has unexpectedly been found that training the decision forest using an objective of information gain of histograms over body parts gives a very good trained forest for the task of regression of joint positions. In this case the training process of FIG. 6 is used where the training set comprises images of body poses with labeled body parts. At box 614 parameters are selected with optimize information gain over body parts. In this way trained decision forests may be "reused" in some situations thus saving training time and costs.

As mentioned above, during the training stage s are calculated for different combinations of parameters in order to select parameters 614, 800 to use at each split node. Various different decision tree node splitting objectives may be used as now described with reference to FIG. 8. As mentioned in the previous paragraph, an information gain 802 objective may be used whereby parameters are selected which optimize information gain of a body part classification task. Another objective comprises selecting parameters which reduce 806 a variance of joint position votes for subsets of the image elements at a split node. For example, parameters may be selected which optimize a reduction in variance of voted joint positions, for example optimizing a variance in distance to joint 814, for subsets of image elements at a split node. It is also possible to select parameters which optimize a variance in angle to joint 816 for subsets of image elements at a split node.

In another example the objective may be to optimize a sum of squared distances 808 from a mean joint position vote of image elements at a split node. Another example is to optimize a balance of the tree 810 such that a subset of image elements which proceeds along a first branch of the split should be similar in size to a subset of image elements which proceeds along the second branch of the split.

Combinations of different objectives (such as any of those of FIG. 8 or others) may be used within individual trees or between trees of a decision forest. That is, it is also possible for different objectives to be used at different split nodes of the same tree, or for different trees in a decision forest. An example of this is where the decision forest is a random regression forest which is arranged to separate regressing the angle to the joint position from the distance to the joint position. That is, a polar form of a regression objective may be used where some split nodes in a forest optimize for minimum variance in angle to joint and others optimize for minimum variance in distance to joint. As mentioned above, during training, a representation of the accumulated votes may be stored 630 using various different methods. These different options are now described in more detail with reference to FIG. 9. Votes are accumulated 900 at training time and, depending on the application domain, there may be huge numbers of votes. The votes may optionally be filtered 902 using a threshold. For example, if the distance from the image element making a vote to the voted joint position is too large the vote may be filtered out. This reduces the number of votes to be processed or stored by ignoring votes which are less likely to be influential and less likely to be correct. The threshold may be learnt per joint using a validation set of images.

The accumulated votes may be stored as raw data such as a list of votes 904. In another example, a random sample 906 of the accumulated votes is stored or samples are taken from the accumulated votes in other ways. In another example a histogram 908 of the accumulated votes is formed or the votes are aggregated by taking a mean vote 910, median vote, mode vote or other form of aggregation.

In the case of joint position votes empirical study shows the data to be multi-modal so that in some embodiments a multi-modal distribution is fitted 912 to the accumulated votes. Examples of fitting a multi-model distribution include using expectation maximization 914 (such as fitting a Gaussian mixture model); using mean shift mode detection 916; using any suitable clustering process such as k-means clustering 918, agglomerative clustering 920 or other clustering processes. Characteristics of the clusters or multi-modal distributions are then stored rather than storing all the individual votes. A weight may also be stored for each cluster or mode. For example, a mean shift mode detection algorithm is used and the number of votes that reached a particular mode may be used as a weight for that mode. Mean shift mode detection is an algorithm that efficiently detects the modes (peaks) in a distribution defined by a Parzen window density estimator. In another example, the density as defined by a Parzen window density estimator may be used as a weight. A Parzen window density estimator (also known as a kernel density estimator) is a non-parametric process for estimating a probability density function, in this case of the accumulated votes. A Parzen window density estimator takes a bandwidth parameter which can be thought of as controlling a degree of smoothing. In some embodiments this bandwidth parameter may be set separately per joint. For example, by searching over several possible values and selecting the value that gives the best accuracy on a validation set of images.

Figure 10:
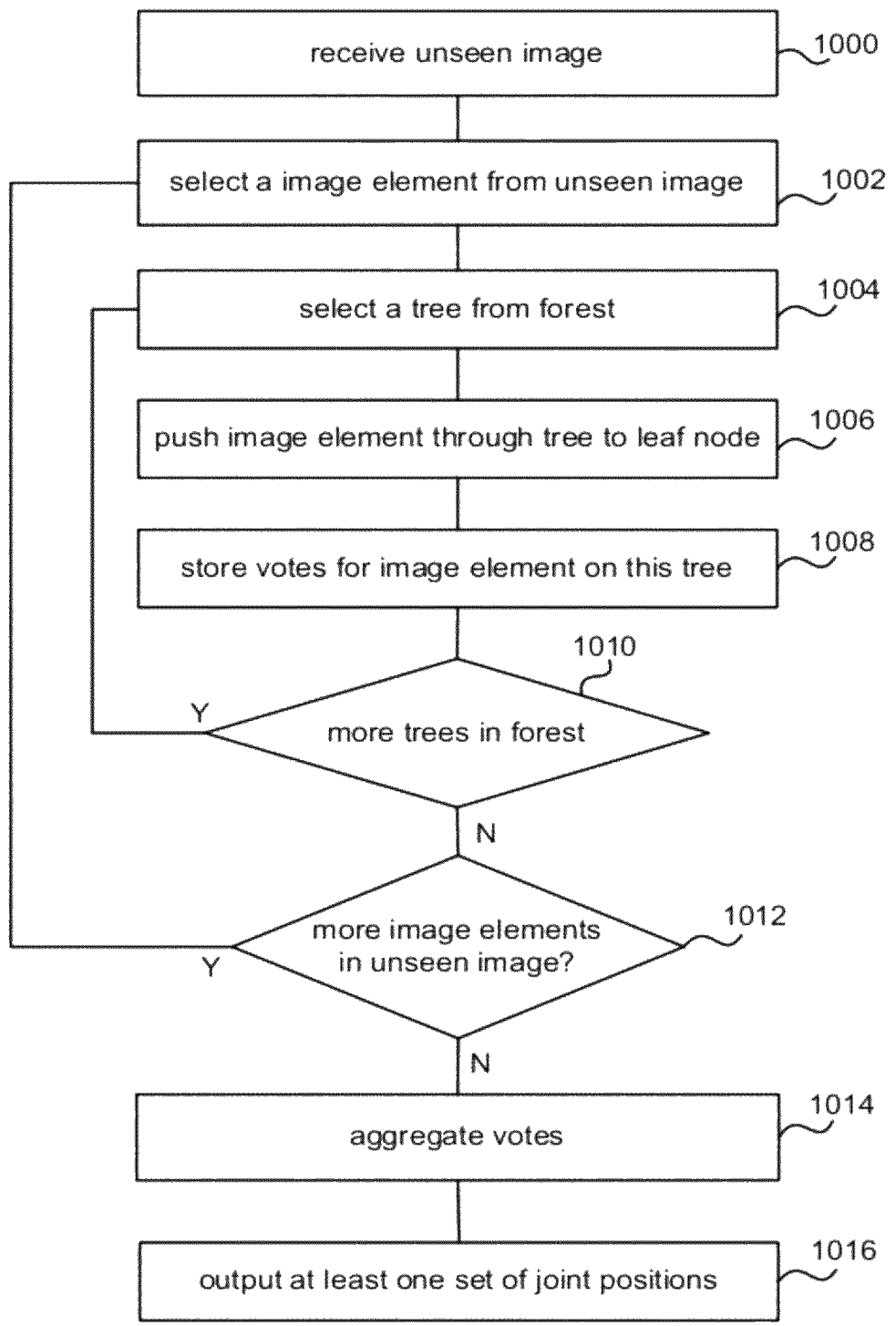
FIG. 10 is a flow diagram of a method of joint position prediction at test time.

FIG. 10 illustrates a flowchart of a process for predicting joint positions in a previously unseen depth image using a decision forest that has been trained as described hereinabove. Firstly, an unseen depth image is received 1000. An image is referred to as 'unseen' to distinguish it from a training image which has the joint positions already specified. Note that the unseen depth image can be pre-processed to an extent, for example to identify foreground regions, which reduces the number of image elements to be processed by the decision forest. However, pre-processing to identify foreground regions is not essential. In some examples the unseen depth image is a silhouette image as described above where the depth image is effectively flattened to a fixed depth.

An image element from the unseen image is selected 1002. A trained decision tree from the decision forest is also selected 1004. The selected image element is pushed 1006 through the selected decision tree (in a manner similar to that described above with reference to FIGS. 16 and 7), such that it is tested against the trained parameters at a node, and then passed to the appropriate child in dependence on the outcome of the test, and the process repeated until the image element reaches a leaf node. Once the image element reaches a leaf node, the accumulated votes (from the training stage) associated with this leaf node are stored 1008 for this image element.

If it is determined 1010 that there are more decision trees in the forest, then a new decision tree is selected 1004, the image element pushed 1006 through the tree and the accumulated votes stored 1008. This is repeated until it has been performed for all the decision trees in the forest. Note that the process for pushing an image element through the plurality of trees in the decision forest can also be performed in parallel, instead of in sequence as shown in FIG. 10.

It is then determined 1012 whether further unanalyzed image elements are present in the unseen depth image, and if so another image element is selected and the process repeated. Once all the image elements in the unseen image have been analyzed, then joint position votes are obtained for all image elements.

As the image elements are pushed through the trees in the decision forest, votes accumulate. These accumulated votes are aggregated 1014 to form an overall vote aggregation for each image element. Methods of aggregating the votes at test time are described with reference to FIG. 11. Optionally a sample of votes may be taken for aggregation. For example, N votes may be chosen at random, or by taking the top N weighted votes, and then the aggregation process applied only to those N votes. This enables accuracy to be traded off against speed.

At least one set of joint positions may then be output 1016 where the joint positions may be confidence weighted. This helps any subsequent tracking algorithm (or other process) assess whether the proposal is good or not. More than one set of joint positions may be output; for example, where there is uncertainty. Also, a set of joint positions may comprise nulls for one or more joints. For example, where a joint position is out of the field of view of the imaging sensor and/or where no image elements vote for a joint position.

In some situations, the body depicted in the unseen image may have one or more occluded joints. For example, a person may be standing as if about to strike a golf ball so that one of his or her wrists is occluded by the other wrist. The joint position prediction system is able to predict the position of the occluded wrist. This is because image elements depicting parts of the person's arm for example may be good predictors of the occluded wrist. The random decision forest has been trained with images of people with wrists and image features which are good predictors of wrist joint positions learnt during the training phase.

Figure 11:
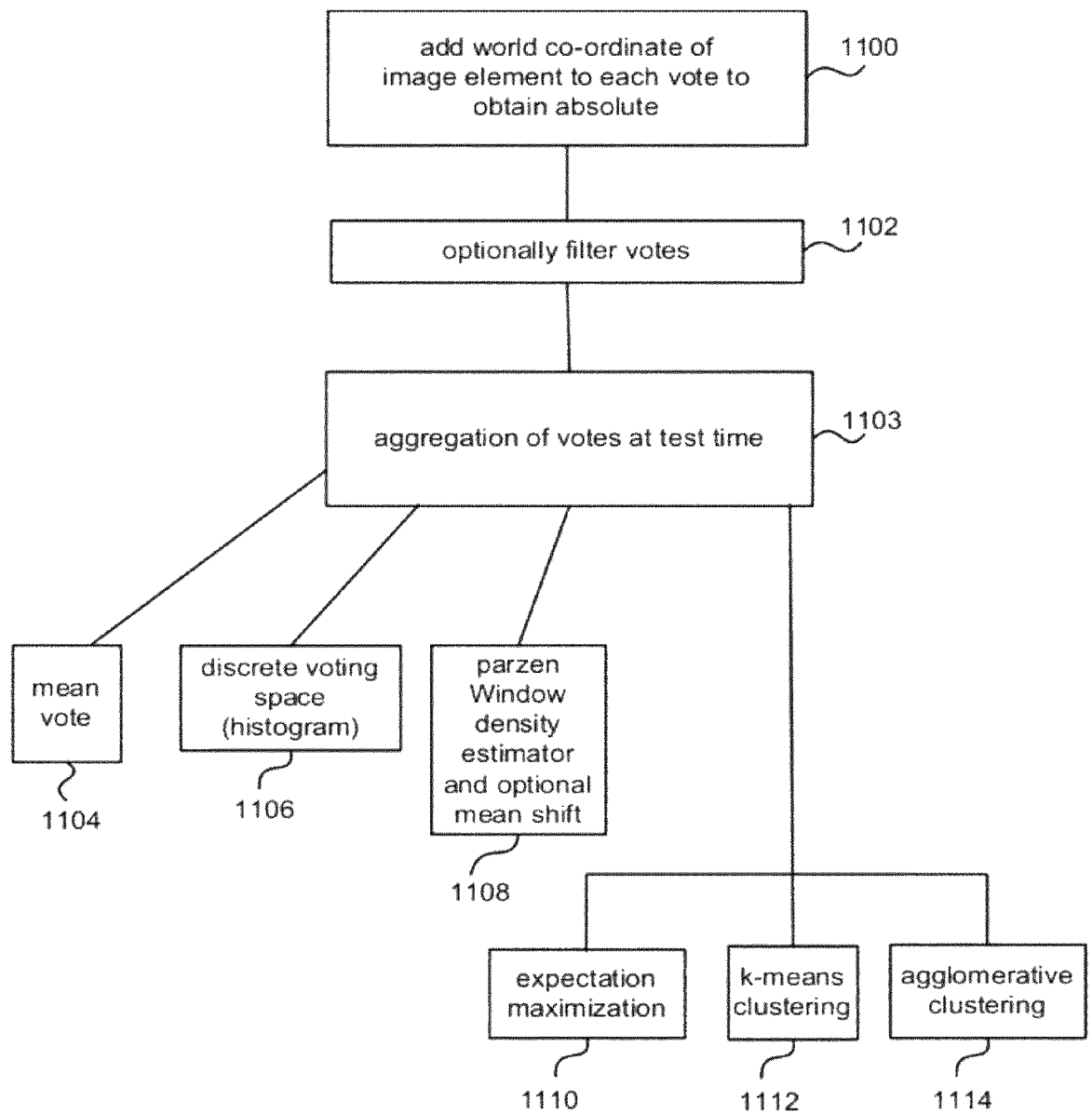
FIG. 11 is a flow diagram of aggregation of joint position votes at test time.

With reference to FIG. 11 various different methods of aggregating the joint position votes at test time may be used. A world co-ordinate of each image element may be added 1100 to each vote to give absolute joint position votes as opposed to relative joint position votes. The votes may optionally be filtered 1102 using a threshold. For example, if the distance from the image element making a vote to the voted joint position is too large the vote may be filtered out. This reduces the number of votes to be processed or stored by ignoring votes which are less likely to be influential and less likely to be correct. The threshold may be learnt per joint using a validation set of images. To aggregate 1103 the votes at test time a mean 1104 may be taken as mentioned above (or a median, or mode or other aggregation statistic). In another example discrete voting space is used such as a histogram. Optionally a smoothing may be done on the discrete voting space. An example of using a discrete voting space is where a Hough transform is used whereby an array, called an accumulator is used to represent the joint position votes. The array has a number of dimensions which is equal to a number of parameters of a parameter space of the votes. An entry is made in the array for each vote according to parameter values of that vote. In this way a 3D histogram of the accumulated votes is formed and an area is selected from that 3D histogram as being the predicted sets of joint positions to be output. For example, the densest area of the 3D histogram is selected In some embodiments a Parzen window density estimator 1108 is used to aggregate the joint position votes at test time. A Parzen window density estimator (also known as a kernel density estimator) is a non-parametric process for estimating a probability density function, in this case of the accumulated votes. The bandwidth parameter of the Parzen window density estimator may be set separately per joint as described above. As mentioned above, mean shift mode detection may then be used to detect the modes in a distribution defined by the Parzen window density estimator.

In more examples, a multi-modal distribution is fitted to the accumulated votes using any one or more of expectation maximization 1110, k-means clustering 1112, agglomerative clustering 1114 or any other clustering process. Each mode or cluster may provide a predicted set of joint positions to be output.

Weights leaned during aggregation of votes at training time and stored along with the votes at the leaf nodes may be used at test time to weight each image element's vote that is cast. Optionally the known depth of the image elements may be used to adapt the weights. This enables human or animals or parts of humans or animals (subjects) further away from the imaging sensor to be given similar influence to those closer to the imaging sensor. Subjects closer to the imaging sensor appear larger in the captured images and so have larger numbers of image elements and so larger numbers of votes as compared with subjects further away from the imaging sensor.

Optionally, an analysis of the variability between accumulated votes at test time may be made. Such an analysis can provide information about the uncertainty of the output sets of joint positions. In one example, the entropy can be determined as a measure of the variability. In another example, when Parzen window density estimators are used, the density at the detected mode can be used as a measure of the uncertainty. In another example, when mean shift is used on a Parzen window density estimator the number of votes that reached each mode may be used as the measure of uncertainty. The information about uncertainty may be used by subsequent processes such as tracking algorithms.

Figure 12:
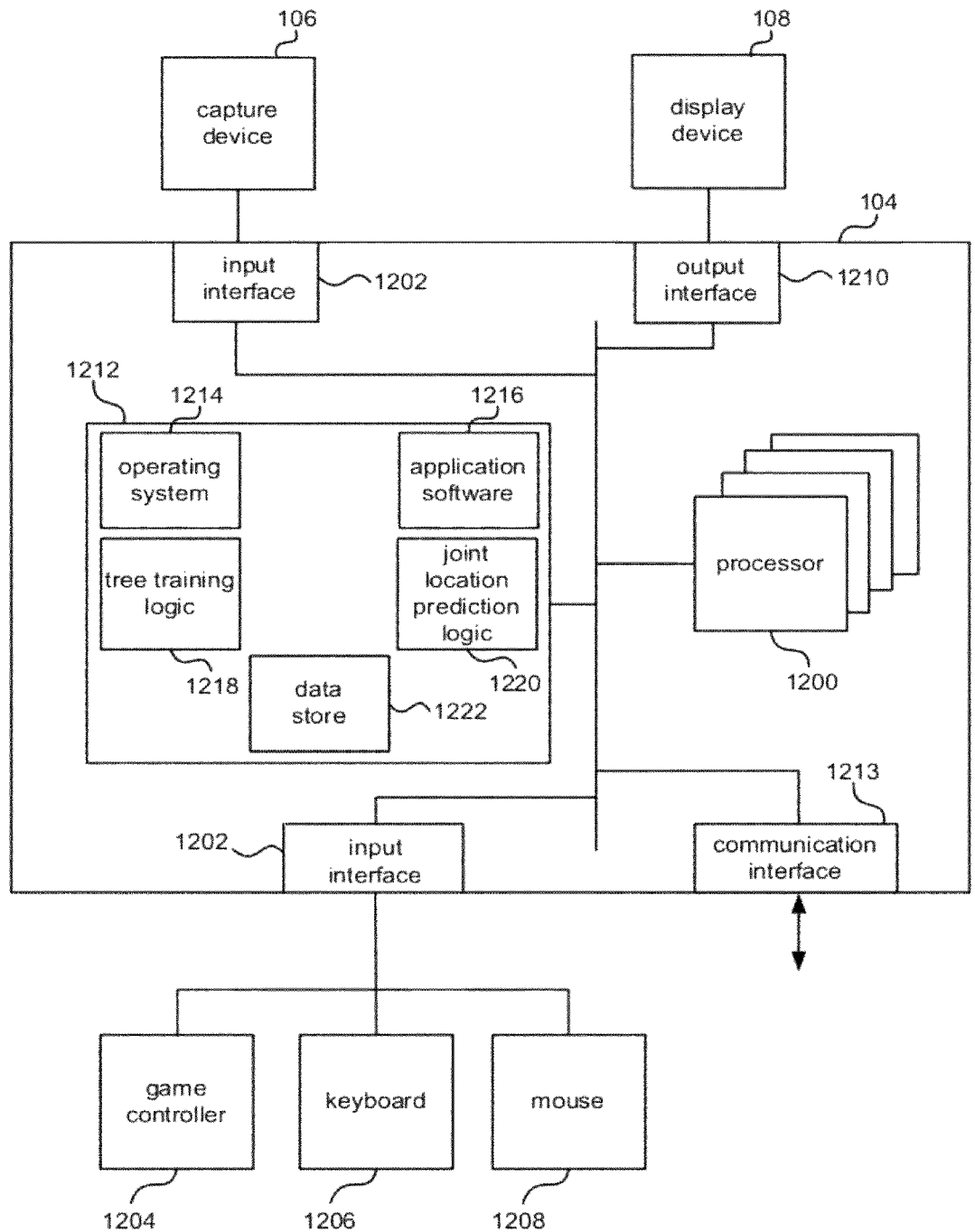
FIG. 12 illustrates an exemplary computing-based device in which embodiments of a joint position predictor may be implemented.

FIG. 12 illustrates various components of an exemplary computing-based device 104 which may be implemented as any form of a computing and/or electronic device, and in which embodiments of joint position prediction systems may be implemented.

Computing-based device 104 comprises one or more processors 1200 which may be microprocessors, controllers, graphics processing units, parallel processing units, or any other suitable type of processors for processing computing executable instructions to control the operation of the device in order to predict joint positions in images. In some examples, for example where a system on a chip architecture is used, the processors 1700 may include one or more fixed function blocks (also referred to as accelerators) which implement a part of the method of joint positions prediction in hardware (rather than software or firmware).

The computing-based device 104 comprises one or more input interfaces 1202 arranged to receive and process input from one or more devices, such as user input devices (e.g. capture device 106, a game controller 1204, a keyboard 1206 and/or a mouse 1208). This user input may be used to control software applications or games executed on the computing device 104.

The computing-based device 104 also comprises an output interface 1210 arranged to output display information to a display device 108 which can be separate from or integral to the computing device 104. The display information may provide a graphical user interface. In an example, the display device 108 may also act as the user input device if it is a touch sensitive display device. The output interface may also output data to devices other than the display device, e.g. a locally connected printing device.

The computer executable instructions may be provided using any computer-readable media that is accessible by computing based device 104. Computer-readable media may include, for example, computer storage media 1212 such as memory and communications media. Computer storage media 1212, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media 1212 (memory) is shown within the computing-based device 104 it will be appreciated that the storage may be distributed or located remotely and accessed via a network or other communication link (e.g. using communication interface 1213).

Platform software comprising an operating system 1214 or any other suitable platform software may be provided at the computing device 104 to enable application software 1216 to be executed on the device. Other software that can be executed on the computing device 104 includes: tree training logic 1218 (see for example, FIGS. 6-7 and description above); joint location prediction logic 1220 (see for example FIG. 10 and description above). A data store 1222 is provided to store data such as previously received depth images; intermediate function results; tree training parameters, probability distributions, classification labels, regression objectives, classification objectives, and other data.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of predicting joint positions comprising:
   receiving an input image of a scene comprising at least part of a human or animal body;
   for each of a plurality of image elements of the input image, making a plurality of votes, each vote being for a position in the input image corresponding to a joint of the human or animal body; the votes being made by comparing each image element with test image elements displaced therefrom by learnt spatial offsets; and
   aggregating the votes to obtain at least one predicted joint position.

2. A method as claimed in claim 1 comprising assigning a confidence to each predicted joint position.

3. A method as claimed in claim 1 comprising aggregating the votes by taking into account weights that have been learnt during a training process the weights expressing information about uncertainty of the votes.

4. A method as claimed in claim 3 comprising for each vote, adapting the weight according to a depth of an image element which made the vote.

5. A method as claimed in claim 1 comprising expressing each vote using a vector related to the direction and distance from an image element of the input image making the vote to a position in the input image where the joint is voted to be.

6. A method as claimed in claim 1 wherein making the plurality of votes comprises applying each image element of the input image to a random decision forest which has been trained using one or more decision tree node splitting objectives and a set of training images having labeled joint positions or labeled body parts.

7. A method as claimed in claim 6 which comprises using at least two decision tree node splitting objectives which are different from one another.

8. A method as claimed in claim 6 wherein the one or more decision tree node splitting objectives are selected from any of: optimizing information gain of a body part classification task, optimizing reduction in variance of voted joint positions, optimizing reduction in variance of distance to voted joint positions, optimizing reduction in variance of angle to voted joint positions, optimizing a sum of squared distances from a mean voted joint position, optimizing a balance of a random regression tree.

9. A method as claimed in claim 1 wherein aggregating the votes comprises any of: forming a discrete voting space of votes, using a Parzen window density estimator, using a Parzen window density estimator with a mean shift mode detection process, using expectation maximization, using k-means clustering, using agglomerative clustering, calculating a mean vote.

10. A method of training a random decision forest to produce votes for positions of joints of a human or animal body in an image comprising:
   receiving a plurality of training images having labeled joint positions;
   receiving at least one decision tree node splitting objective;
   selecting parameters for use at nodes of trees in the random decision forest by using the training images and the at least one objective;
   at each leaf node of each tree in the random decision forest obtaining a plurality of votes by applying the training images to the random decision forest with the selected parameters; each vote being for a relative position in a training image predicted to correspond to a joint of the human or animal body;
   aggregating the votes at each leaf node by any of: listing the votes, forming a histogram of votes, calculating a mean of the votes, and fitting a multi-modal distribution to the votes by any of expectation maximization, mean shift mode detection, k-means clustering and agglomerative clustering.

11. A method as claimed in claim 10 comprising filtering the votes using a threshold prior to aggregating the votes.

12. A method as claimed in claim 11 wherein the threshold is learnt on a per joint basis using a validation set of images.

13. A method as claimed in claim 11 wherein the threshold is a distance of a joint position from an image element voting for that joint position.

14. A method as claimed in claim 10 comprising aggregating the votes by using a probability distribution density estimator to find one or more modes and determining a weight for each mode the weight being related to a number of votes that reached that mode.

15. A method as claimed in claim 14 comprising using a mean shift mode detection process to assess the number of votes that reached each mode.

16. A method as claimed in claim 14 comprising setting a parameter of the density estimator on a per joint basis.

17. A computer-implemented joint position prediction system comprising:
   an input arranged to receive an input image of a scene comprising at least part of a human or animal body;
   a processor arranged, for each of a plurality of image elements of the input image, to make a plurality of votes, each vote being for a position in the input image corresponding to a joint of the human or animal body; the processor being arranged to aggregate the votes to obtain at least one predicted joint position; the processor being arranged to store each vote using a vector related to the direction and distance from an image element of the input image making the vote to a position in the input image where the joint is voted to be.

18. A system as claimed in claim 17 wherein the processor is arranged to aggregate the votes by taking into account weights expressing an uncertainty associated with each vote.

19. A system as claimed in claim 18 wherein the processor is arranged to adapt the weights according to depth values associated with image elements.

20. A computer game system comprising a joint position prediction system as claimed in claim 17.

* * * * *